No. 708,608. Patented Sept. 9, 1902.
W. A. H. ZANDER.
GAMBREL.
(Application filed Feb. 18, 1902.)
(No Model.)
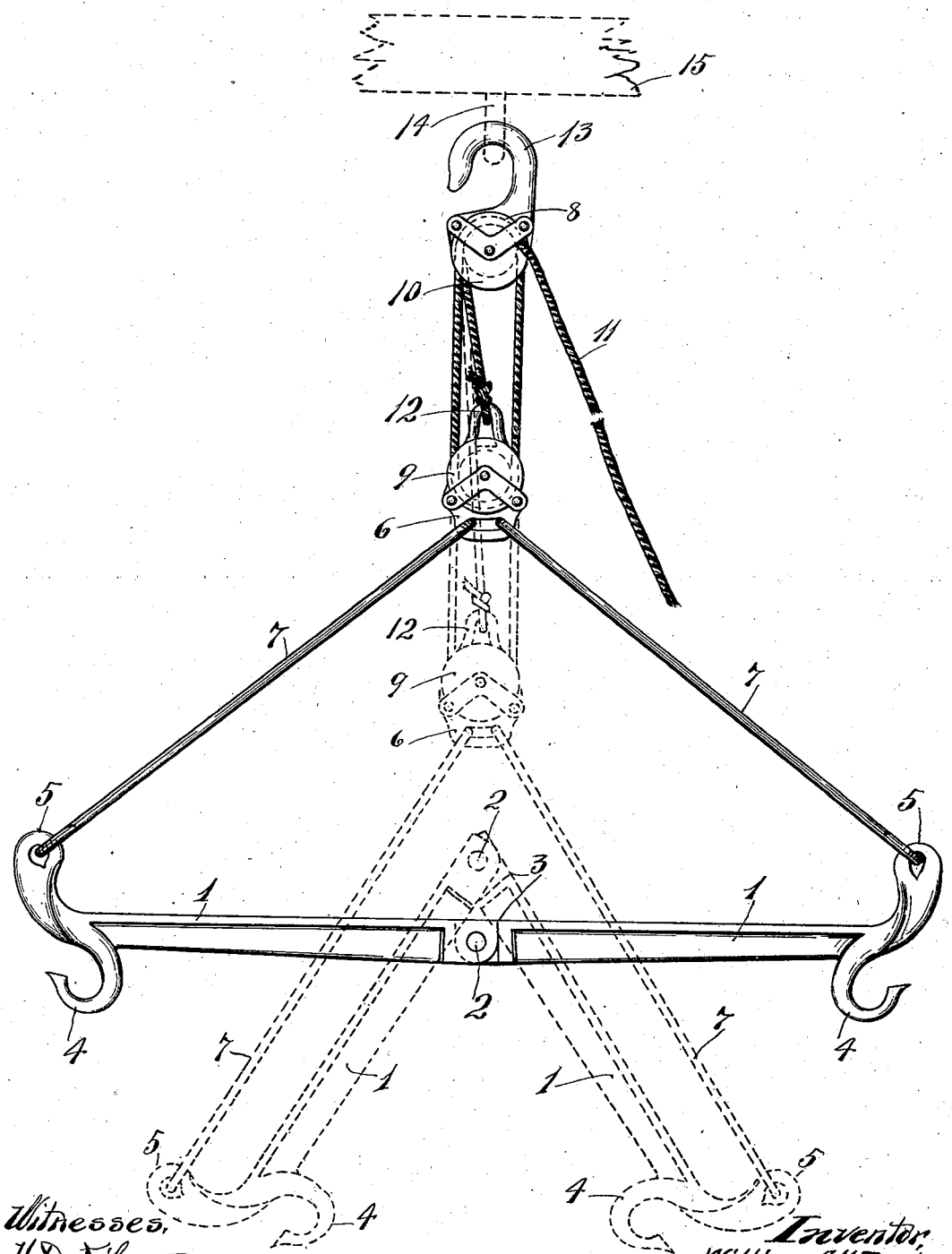
Witnesses,
H. D. Kilgore,
A. H. Opsahl.
Inventor,
William A. H. Zander,
By his Attorneys,
Williamson & Merchant
THE NORRIS PETERS CO., PHOTO-LITHO., WASHINGTON, D. C.

UNITED STATES PATENT OFFICE.

WILLIAM A. H. ZANDER, OF HOPKINS, MINNESOTA, ASSIGNOR OF ONE-HALF TO JOHN A. EHRHARDT AND MORRIS B. MYERS, OF STANTON, NEBRASKA.

GAMBREL.

SPECIFICATION forming part of Letters Patent No. 708,608, dated September 9, 1902.

Application filed February 18, 1902. Serial No. 94,601. (No model.)

*To all whom it may concern:*

Be it known that I, WILLIAM A. H. ZANDER, a citizen of the United States, residing at Hopkins, in the county of Hennepin and State of Minnesota, have invented certain new and useful Improvements in Gambrels; and I do hereby declare the following to be a full, clear, and exact description of the invention, such as will enable others skilled in the art to which it appertains to make and use the same.

My invention has for its object to provide an improved gambrel; and to this end it consists of the novel devices and combinations of devices hereinafter described, and defined in the claim.

A device designed in accordance with my invention is illustrated in the accompanying drawing.

The thrust member of the gambrel is afforded by the rigid toggle-lever 1, the members of which are pivotally connected at 2 by a joint having coöperating stop-shoulders 3, which limit the downward movement of the said joint approximately to the position indicated by full lines in the single view of the drawing. At their outer ends the toggle-levers 1 are provided with hooks 4 and with hinge ears or lugs 5, the latter of which preferably form upward continuations of the former. The hinge ears or lugs 5 project considerably above the members 1, and they are connected to a suitable support, such as the block 6 of a block and tackle, by means of links or connecting-rods 7. These rods 7 constitute what may be termed a "tension-toggle," inasmuch as they are adapted to fold with a toggle action and are subjected to tensile strains. When the intermediate joint portion of the toggle 1 is forced above a horizontal line intersecting the connections between the rods 7 and the ears 5, both toggles 1 and 7 will under the weight of the load of the animal suspended thereby buckle into the position indicated by dotted lines in the said view of the drawing. On the other hand, when the said toggle 1 is forced into its spread position (indicated by full lines) its pivotal joint 2 is below the horizontal line of the connections between the rods 7 and ears 5, and hence will be held by gravity and the weight of the load in such position. The manner of applying the hooks 4 to the cords of the hind legs of the animal is well understood by all persons familiar with the use of these devices.

The gambrel is supported by a block and tackle involving the block 6, already noted, another tackle-block 8, guide-sheaves 9 and 10, respectively, on said blocks 6 and 8, and a rope 11, which rope runs over the said sheaves 9 and 10 and is connected at one end to an ear 12 on the tackle-block 6. The upper tackle-block 8 is shown as provided with a heavy hook 13, which is adapted to be hooked into an eye 14 of a suitable overhead support 15.

It will be noted that the so-called "tension-toggle" afforded by the rod 7 is much longer than the "thrust-toggle," so that the two toggles are folded, as shown by dotted lines. The latter does not fold past or overlap the former. When the parts are buckled, as shown by dotted lines, the hooks 4 may be readily applied to the animal to be suspended or removed therefrom. To spread the toggle, it is only necessary to force downward the central or pivotally-connected portion of the toggle 1, and, on the other hand, to buckle the toggle it is only necessary to force the central portion of the same upward to an extent already described.

What I claim, and desire to secure by Letters Patent of the United States, is as follows:

The combination with a block and tackle, of a gambrel comprising the compression-toggle 1, the members of which are pivotally connected and are provided with the coöperating stops 3, depending hooks 4 and upwardly-extending lugs 5, and the toggle-links 7 pivotally connected to said lugs 5 and to one of the tackle-blocks, which toggles 1 and 7 are adapted to be buckled or folded into approximately parallel positions, substantially as described.

In testimony whereof I affix my signature in presence of two witnesses.

WILLIAM A. H. ZANDER.

Witnesses:
 ELIZABETH KELEHER,
 F. D. MERCHANT.